United States Patent
Yonaha (10) Patent No.: US 8,644,625 B2
(45) Date of Patent: Feb. 4, 2014

(54) OBJECT DETECTION DEVICE, METHOD AND PROGRAM

(75) Inventor: Makoto Yonaha, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 24 days.

(21) Appl. No.: 13/543,487

(22) Filed: Jul. 6, 2012

(65) Prior Publication Data

US 2013/0011012 A1    Jan. 10, 2013

(30) Foreign Application Priority Data

Jul. 8, 2011    (JP) .................. 2011-151872

(51) Int. Cl.
- G06K 9/00    (2006.01)
- G06K 9/62    (2006.01)
- G06K 9/34    (2006.01)

(52) U.S. Cl.
USPC ............ 382/224; 382/103; 382/159; 382/173

(58) Field of Classification Search
None
See application file for complete search history.

(56) References Cited

U.S. PATENT DOCUMENTS

| | | | |
|---|---|---|---|
| 2007/0122010 A1* | 5/2007 | Kitamura et al. | 382/118 |
| 2011/0235901 A1* | 9/2011 | Hu | 382/159 |

FOREIGN PATENT DOCUMENTS

| | | |
|---|---|---|
| JP | 2002-269545 A | 9/2002 |
| JP | 2007-193740 A | 8/2007 |
| JP | 2009-15614 A | 1/2009 |
| JP | 2009-116400 A | 5/2009 |
| JP | 2009-295100 A | 12/2009 |

* cited by examiner

*Primary Examiner* — Stephen R Koziol
*Assistant Examiner* — Timothy Choi
(74) *Attorney, Agent, or Firm* — Birch, Stewart, Kolasch & Birch, LLP

(57) ABSTRACT

When scores of classifiers for discriminating an image to be discriminated are sequentially obtained in a predetermined order, positions of saturated pixels in the image to be discriminated are detected. For each classifier which outputs the score based on pixel values at the detected position, the score is obtained by obtaining a value determined based on a difference between a discontinuing threshold set in advance correspondingly to the identified classifier and a discontinuing threshold set in advance correspondingly to a classifier immediately before the identified classifier. For each of the other classifiers, the score is obtained by obtaining an output obtained by applying the classifier to the image to be discriminated. A sum of the scores obtained so far is compared with the discontinuing threshold. If the sum exceeds the discontinuing threshold, the score of the next classifier is obtained.

15 Claims, 4 Drawing Sheets

OBJECT DETECTION DEVICE, METHOD AND PROGRAM

BACKGROUND OF THE INVENTION

1. Field of the Invention

The present invention relates to an object detection device, an object detection method and an object detection program for detecting a specific object, such as an eye, from an input image, such as a face image.

2. Description of the Related Art

In recent years, image processing devices are used that detect an eye image from a face image of a driver, which is taken with an on-board camera, and perform various types of processing, such as detecting the gaze direction of the driver, based on the eye image.

As a technique for detecting an eye from a face image, there is a known technique using a plurality of classifiers which are generated and prepared through a learning process using a number of sample images of a predetermined size showing an eye. The classifiers are assigned with different positions on an image to be discriminated, so that each classifier calculates a value that represents a probability of the image to be discriminated being an eye image based on pixel values at the assigned position. Then, partial images of a face image are sequentially cut out to determine whether or not each partial image is an eye image using the classifiers.

However, in the case where the driver wears eyeglasses or sunglasses, sun light or illumination is reflected at the lenses or the frame of the glasses and the reflected light may be captured in the face image, which may hinder the eye image detection from the face image. In order to address this problem, Japanese Unexamined Patent Publication No. 2002-269545 (hereinafter, Patent Document 1) proposes a technique to improve accuracy of eye detection, which involves detecting, from a face image, all the pixels which have a luminance value higher than a predetermined value, substituting the pixel value of each detected pixel with an average color of neighboring pixels to generate a processed image from which high luminance portions have been removed, and detecting an eye from the processed image.

With the technique of Patent Document 1, however, it is necessary to perform, in advance on an image of interest of the detection, the image correction process, such as detecting the high luminance pixels, obtaining the pixel values of the neighboring pixels of each detected pixel and calculating the average value thereof, and substituting the pixel value of each pixel with the calculated average value. Such an image correction process takes time, resulting in low processing speed. This is particularly problematic when the eye detection is performed sequentially on successive images taken with a monitoring camera, or the like. Further, even when such an image correction process is performed, the process may not necessarily be appropriate or sufficient.

SUMMARY OF THE INVENTION

In view of the above-described circumstances, the present invention is directed to providing an object detection device, an object detection method and an object detection program which allow accurate object detection by appropriately minimizing the influence of reflected light on detection of a specific object, such as an eye, without requiring the image correction process, as described above, to be performed as pre-processing.

A first aspect of the object detection device of the invention is an object detection device for detecting a specific object from an input image, the device including:

a plurality of classifiers obtained through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

a partial image cutting out unit configured to cut out partial images of the predetermined size at different positions on the input image; and a discriminating unit configured to sequentially obtain scores of the classifiers in a predetermined order, the discriminating unit detecting, for each partial image, a position of a saturated pixel in the partial image, identifying, from the classifiers, a classifier to which the detected position is assigned, obtaining the score of each identified classifier by obtaining a value determined based on a difference between a discontinuing threshold set in advance correspondingly to the identified classifier and a discontinuing threshold set in advance correspondingly to one of the classifiers for which the score is obtained immediately before the identified classifier, and obtaining the score of each of the other classifiers by obtaining an output obtained by applying the classifier to the partial image, each time the score of each classifier has been obtained, determining whether or not a sum of the scores obtained so far exceeds the discontinuing threshold set in advance correspondingly to the classifier, if the sum of the scores obtained so far does not exceed the discontinuing threshold, determining that the partial image is not an image showing the object and discontinuing an operation to obtain the score, if the sum of the scores obtained so far exceeds the discontinuing threshold, obtaining the score of the next classifier, when the scores for all the classifiers have been obtained, determining whether or not a sum of the scores obtained for all the classifiers exceeds a discrimination threshold set in advance, if the sum of the scores obtained for all the classifiers exceeds the discrimination threshold, determining that the partial image is an image showing the object, and if the sum of the scores obtained for all the classifiers does not exceed the discrimination threshold, determining that the partial image is not an image showing the object.

The description "obtaining the score of each identified classifier by obtaining a value determined based on a difference between a discontinuing threshold set in advance correspondingly to the identified classifier and a discontinuing threshold set in advance correspondingly to one of the classifiers for which the score is obtained immediately before the identified classifier" herein refers to obtaining a difference between the discontinuing thresholds or a value obtained by multiplying the difference between the discontinuing thresholds by R (R is a real number of 1 or more) as the score.

The object detection device may further include a reliability calculating unit configured to calculate, if the sum of the scores obtained for all the classifiers exceeds the discrimination threshold, a reliability of the discrimination based on a ratio of a sum of the scores obtained for the identified classifiers to the sum of the scores obtained for all the classifiers.

The reliability calculated by the reliability calculating unit may be lower as the ratio is larger.

The discontinuing threshold may be provided correspondingly to each of the classifiers and may have a value that is larger as the order of the corresponding classifier is lower, and a value which is determined based on a difference between the discontinuing threshold set in advance correspondingly to each certain classifier and the discontinuing threshold set in advance correspondingly to a classifier for which the score is obtained immediately before the certain classifier may be a possible minimum value of the score of the certain classifier if the image to be discriminated is an image showing the object.

A second aspect of the object detection device of the invention is an object detection device for detecting a specific object from an input image, the device including:

a plurality of classifiers obtained through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

a partial image cutting out unit configured to cut out partial images of the predetermined size at different positions on the input image; and a discriminating unit configured to detect, for each partial image, a position of a saturated pixel in the partial image, identify, from the classifiers, a classifier to which the detected position is assigned, obtain an output obtained by applying each of the classifiers other than the identified classifiers to the partial image as a score of the applied classifier, determine whether or not a sum of the obtained scores exceeds a discrimination threshold, the discrimination threshold being obtained by subtracting a sum of possible minimum values of the scores of all the identified classifiers if the partial image is an image showing the object from a sum of possible minimum values of the scores of all the classifiers if the partial image is an image showing the object, if the sum of the obtained scores exceeds the discrimination threshold, determine that the partial image is an image showing the object, and if the sum of the obtained scores does not exceed the discrimination threshold, determine that the partial image is not an image showing the object.

A first aspect of the object detection method of the invention is an object detection method for detecting a specific object from an input image, which is executed by at least one computer, the method including the steps of:

generating and preparing a plurality of classifiers through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

cutting out partial images of the predetermined size at different positions on the input image; and sequentially obtaining scores of the classifiers in a predetermined order, including detecting, for each partial image, a position of a saturated pixel in the partial image, identifying, from the classifiers, a classifier to which the detected position is assigned, obtaining the score of each identified classifier by obtaining a value determined based on a difference between a discontinuing threshold set in advance correspondingly to the identified classifier and a discontinuing threshold set in advance correspondingly to one of the classifiers for which the score is obtained immediately before the identified classifier, and obtaining the score of each of the other classifiers by obtaining an output obtained by applying the classifier to the partial image, each time the score of each classifier has been obtained, determining whether or not a sum of the scores obtained so far exceeds the discontinuing threshold set in advance correspondingly to the classifier, if the sum of the scores obtained so far does not exceed the discontinuing threshold, determining that the partial image is not an image showing the object and discontinuing an operation to obtain the score, if the sum of the scores obtained so far exceeds the discontinuing threshold, obtaining the score of the next classifier, when the scores for all the classifiers have been obtained, determining whether or not a sum of the scores obtained for all the classifiers exceeds a discrimination threshold set in advance, if the sum of the scores obtained for all the classifiers exceeds the discrimination threshold, determining that the partial image is an image showing the object, and if the sum of the scores obtained for all the classifiers does not exceed the discrimination threshold, determining that the partial image is not an image showing the object.

The object detection method may further include the step of calculating, if the sum of the scores obtained for all the classifiers exceeds the discrimination threshold, a reliability of the discrimination based on a ratio of a sum of the scores obtained for the identified classifiers to the sum of the scores obtained for all the classifiers.

A second aspect of the object detection method of the invention is an object detection method for detecting a specific object from an input image, the method including:

generating and preparing a plurality of classifiers through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

cutting out partial images of the predetermined size at different positions on the input image;

detecting, for each partial image, a position of a saturated pixel in the partial image;

identifying, from the classifiers, a classifier to which the detected position is assigned;

obtaining an output obtained by applying each of the classifiers other than the identified classifiers to the partial image as a score of the applied classifier;

determining whether or not a sum of the obtained scores exceeds a discrimination threshold, the discrimination threshold being obtained by subtracting a sum of possible minimum values of the scores of all the identified classifiers if the partial image is an image showing the object from a sum of possible minimum values of the scores of all the classifiers if the partial image is an image showing the object;

if the sum of the obtained scores exceeds the discrimination threshold, determining that the partial image is an image showing the object, and if the sum of the obtained scores does not exceed the discrimination threshold, determining that the partial image is not an image showing the object.

First and second aspects of the object detection program of the invention are a program for causing at least one computer to execute the operations that are performed by the units of the first and second aspects of the object detection device. The program is offered to the user with being recorded in a recording medium, such as a CD-ROM or DVD, or recorded in a downloadable state in a storage attached to a server computer or in a network storage.

It should be noted that the specific object to be detected by the object detection device, method and program may be an eye or another object, such as a person's face.

According to the first aspect of the object detection device, method and program of the invention, a specific object is detected from an input image by: generating and preparing a plurality of classifiers through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object; cutting out partial images of the predetermined size at different positions on the input image; and sequentially obtaining scores of the classifiers in a predetermined order by: detecting, for each partial image, a position of a saturated pixel in the partial image; identifying, from the classifiers, a classifier to which the detected position is assigned; obtaining the score of each identified classifier by obtaining a value determined based on a difference between a discontinuing threshold set in advance correspondingly to the identified classifier and a discontinuing threshold set in advance correspondingly to one of the classifiers for which the score is obtained immediately before the identified classifier, and obtaining the score of each of the other classifiers by obtaining an output obtained by applying the classifier to the partial image; each time the score of each classifier has been obtained, determining whether or not a sum of the scores obtained so far exceeds the discontinuing threshold set in advance correspondingly to the classifiers; if the sum of the scores obtained so far does not exceed the discontinuing threshold, determining that the partial image is not an image showing the object and discontinuing an operation to obtain the score; if the sum of the scores obtained so far exceeds the discontinuing threshold, obtaining the score of the next classifier; when the scores for all the classifiers have been obtained, determining whether or not a sum of the scores obtained for all the classifiers exceeds a discrimination threshold set in advance; if the sum of the scores obtained for all the classifiers exceeds the discrimination threshold, determining that the partial image is an image showing the object; and if the sum of the scores obtained for all the classifiers does not exceed the discrimination threshold, determining that the partial image is not an image showing the object. In this manner, even when the input image includes saturated pixels due to reflected light, the result of discrimination is not influenced by outputs from the classifiers assigned to those pixels, thereby achieving accurate eye detection with appropriately minimizing the influence of the reflected light. Further, it is not necessary to perform the image correction process, as described in Patent Document 1, as pre-processing, and this allows a simpler device configuration and image processing.

In the above-described object detection device, method and program, in the case where a reliability of the discrimination is calculated from a ratio of the sum of the scores obtained for the identified classifiers to the sum of the scores obtained for all the classifiers if the sum of the scores obtained for all the classifiers exceeds the discrimination threshold, the calculated reliability may be offered to the user as information for determining whether or not the result of discrimination is reliable, or subsequent operations may be designed depending on the calculated reliability.

According to the second aspect of the object detection device, method and program of the invention, a specific object is detected from an input image by: generating and preparing a plurality of classifiers through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object; cutting out partial images of the predetermined size at different positions on the input image; detecting, for each partial image, a position of a saturated pixel in the partial image; identifying, from the classifiers, a classifier to which the detected position is assigned; obtaining an output obtained by applying each of the classifiers other than the identified classifiers to the partial image as a score of the applied classifier; determining whether or not a sum of the obtained scores exceeds a discrimination threshold, the discrimination threshold being obtained by subtracting a sum of possible minimum values of the scores of all the identified classifiers if the partial image is an image showing the object from a sum of possible minimum values of the scores of all the classifiers if the partial image is an image showing the object; if the sum of the obtained scores exceeds the discrimination threshold, determining that the partial image is an image showing the object, and if the sum of the obtained scores does not exceed the discrimination threshold, determining that the partial image is not an image showing the object. In this manner, even when the input image includes saturated pixels due to reflected light, the result of discrimination is not influenced by outputs from the classifiers assigned to those pixels, thereby achieving accurate eye detection with appropriately minimizing the influence of the reflected light. Further, it is not necessary to perform the image correction process, as described in Patent Document 1, as pre-processing, and this allows a simpler device configuration and image processing.

DESCRIPTION OF THE PREFERRED EMBODIMENTS

Hereinafter, an embodiment where an object detection device, an object detection method and an object detection program of the invention are applied to detection of an eye from an input image will be described with reference to the drawings. An eye detection device according to this embodiment is implemented by installing an eye detection program on a computer. The eye detection program is distributed with being recorded on a recording medium, such as a DVD, CD-ROM, or the like, and is installed on the computer from the recording medium. Alternatively, the eye detection program may be stored in a storage device of a server computer connected to a network or in a network storage such that it is externally accessible, and may be downloaded and installed on a computer in response to a request by the user.

Figure 1:
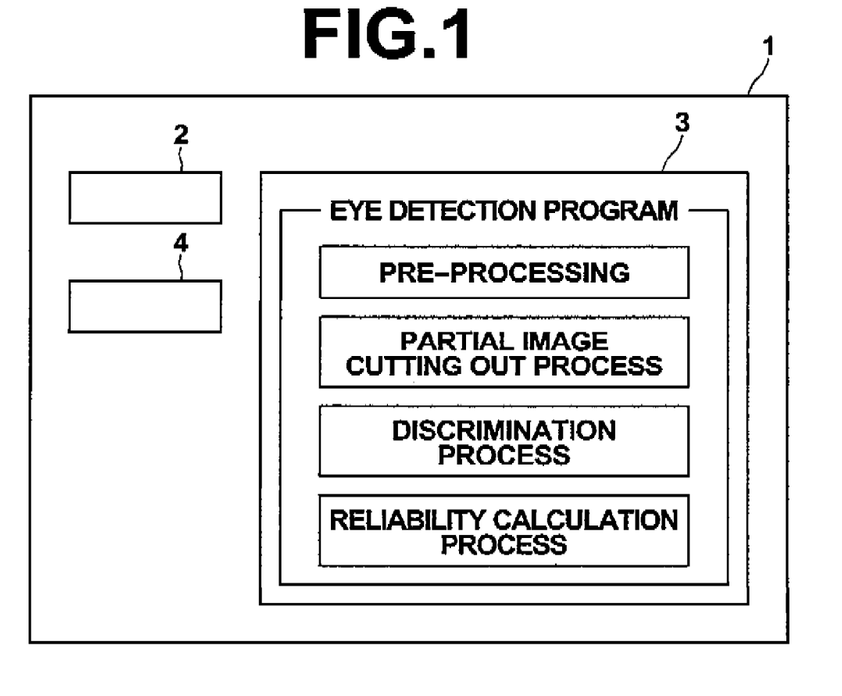
FIG. 1 is a block diagram illustrating the configuration of an eye detection system.

FIG. 1 shows the schematic configuration of the eye detection device, which is implemented by installing the eye detection program on a computer. As shown, the eye detection device 1 includes a CPU 2, a memory 3, a storage device 4, etc.

The storage 4 stores an input image, which is to be subjected to an eye detection process. The input image may, for example, be a face image of a driver taken with an on-board camera.

The memory 3 stores the eye detection program and data (such as a discontinuing threshold and a discrimination threshold) referenced by the eye detection program. The eye detection program prescribes, as operations to be executed by the CPU 2, pre-processing, a partial image cutting out process, a discrimination process, a reliability calculation process, etc. As the CPU 2 executes these operations according to the program, the computer functions as a pre-processing means, a partial image cutting out means, a discriminating means and a reliability calculating means.

Figure 2:
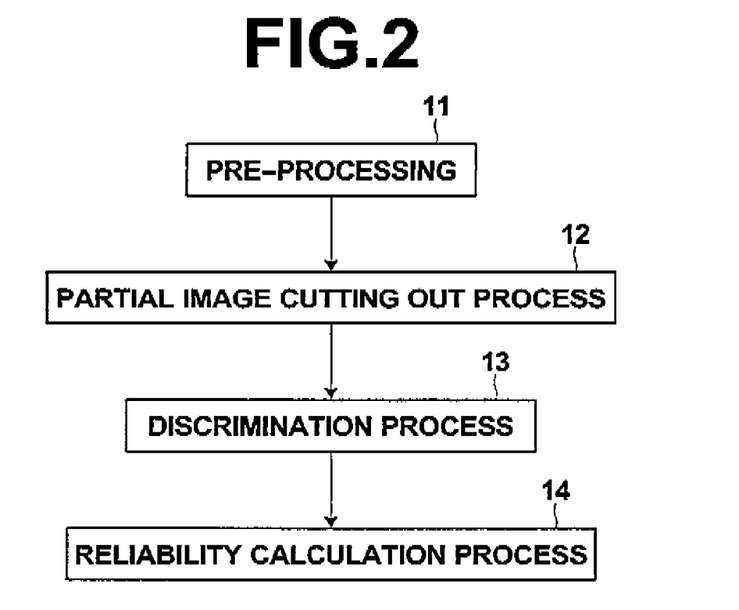
FIG. 2 is a diagram illustrating the outline of processes executed by an eye detection device.

Now, the individual operations executed by the eye detection device 1 are described. FIG. 2 shows the outline of the operations executed by the image processing device 1. First, the eye detection device 1 loads the input image from the storage 4 into the memory 3, and executes the pre-processing 11 for allowing effective detection. For example, the pre-processing 11 may include normalization to convert pixel values of the entire input image according to a conversion curve (lookup table), which apply so-called reverse gamma conversion to the pixel values and then take the logarithm of the values.

It should be noted that, in a case where the pre-processing includes neighborhood processing (illumination correction, etc.) using an average value or variance of the neighborhood area (for example, 7×7 pixels), a determination as to whether or not there is a saturated pixel in the input image may be made, and if there is a saturated pixel, the average value or variance may be calculated using pixels other than the saturated pixel to perform the correction based on the thus calculated average value or variance. The determination as to whether or not there is a saturated pixel in the input image can be achieved by comparing the pixel value of each pixel of the input image with a possible maximum value (saturation value) of the pixel to determine whether or not there is a pixel having the maximum value. This can prevent lowering of the determination (evaluation) accuracy of classifiers, to which the neighborhood positions of the saturated pixel are assigned, and can minimize failure in the eye detection.

Subsequently, the eye detection device 1 executes the partial image cutting out process 12 on the pre-processed input image. In the partial image cutting out process 12, a window having a predetermined size is set sequentially at different positions on the input image to cut out each partial image within the window.

Then, the eye detection device 1 executes the discrimination process 13 on each partial image (image to be discriminated) cut out using the window. In the discrimination process 13, a group of classifiers, which are generated and prepared in advance, are used to determine whether or not each cut-out partial image (image to be discriminated) is an eye image. The details of the discrimination process 13 will be described later.

Now, the configuration of the group of classifiers and a method for generating the group of classifiers are described. The group of classifiers includes a plurality of classifiers C1, C2, ..., and CN, which are effective classifiers for discrimination selected from a number of classifiers obtained through a learning process, which will be described later, and connected in series in the order of effectiveness. The classifiers C1, C2, ..., and CN are respectively assigned to different positions on the image to be discriminated. Each classifier calculates and outputs a value representing a probability of the image to be discriminated being an eye image, based on the pixel values of the pixels at the assigned position. The positions assigned to the classifiers may, for example, be positions of points forming a group of pairs, which includes pairs of predetermined two points set on the image to be discriminated (see the following description).

Figure 3:
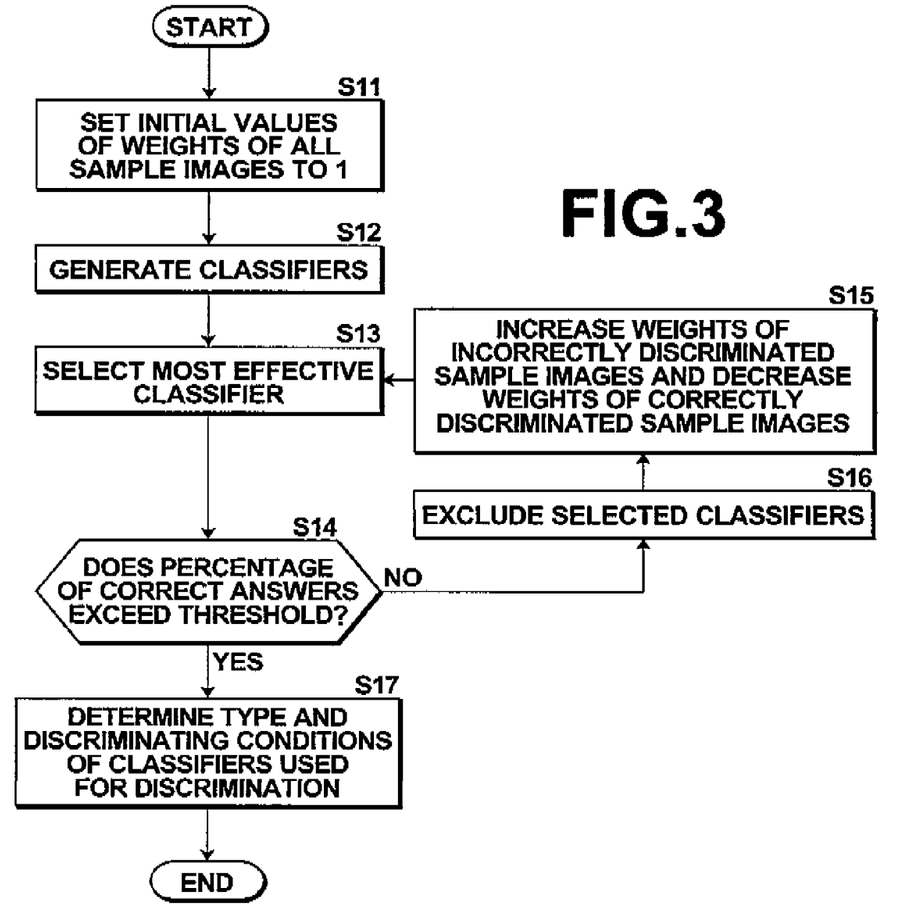
FIG. 3 is a flow chart illustrating a method for generating classifiers.

FIG. 3 is a flow chart illustrating the method for generating the group of classifiers. To generate the group of classifiers, sample images which have been standardized to have a predetermined size and subjected to a normalization process similar to the above-described normalization are used. The sample images include different sample images, which are known that they show an eye, and different non-eye sample images, which are known that they do not show an eye. These sample images are weighted, i.e., assigned with importance levels, respectively. First, the initial value of 1 is set as the weights of all the sample images (step S11).

Then, a classifier is generated for each of different types of groups of pairs including pairs of predetermined two points set on the sample image (step S12). Each classifier outputs a value representing a probability of the image to be discriminated being an eye image using a combination of differential values between pixel values of the two points of the individual pairs forming the group which is assigned to the classifier.

Then, from the classifiers generated in step S12, the most effective classifier for discriminating whether or not an image shows an eye is selected. The selection of the most effective classifier is achieved with taking the weights of the sample images into account. In this example, weighted percentage of correct answers by the classifiers are compared with each other, and the classifier that exhibits the highest weighted percentage of correct answers is selected (step S13). That is, in the first step S13, the weights of the sample images are "1", and therefore simply the classifier that has provided the highest number of correct answers as to whether or not each image shows an eye is selected as the most effective classifier.

Then, whether or not a percentage of correct answers as to whether or not each sample image is an eye image provided by a combination of the classifier(s) selected so far exceeds a predetermined threshold is checked (step S14). If the percentage of correct answers exceeds the predetermined threshold, this means that the discrimination as to whether or not an image is an eye image can be achieved with sufficiently high probability using the classifiers selected so far, and the learning process ends. If the percentage of correct answers does not exceed the predetermined threshold, the process proceeds to step S16 to select an additional classifier to be used in combination with the classifiers selected so far. In step S16, the classifier that has been selected in step S13 is excluded so that it will not be selected again.

Then, the weights of the sample images which have not correctly been discriminated by the classifier(s) selected in step S13 are increased and the weights of the sample images which have correctly been discriminated by the classifiers)

are decreased (step S15). Subsequently, the process returns to step S13, and the next effective classifier is selected based on the weighted percentage of correct answers, as described above.

By repeating the above-described steps S13 to S16, the classifiers which correspond to the combination of differential values between pixel values of predetermined two points of the individual pairs forming a certain group of pairs are selected as classifiers suitable to perform the discrimination as to whether or not an image is an eye image. When the percentage of correct answers checked in step S14 exceeds the threshold, the type and discriminating conditions of the classifiers used to the discrimination are determined (step S17), and the learning process ends. It should be noted that the selected classifiers are linearly combined in the order of the weighted percentage of correct answers from the highest to form the group of classifiers.

Further, when the classifiers C1, C2, . . . , and CN forming the group of classifiers have been determined, a list showing correspondence between each classifier forming the group of classifiers and the positions of the points forming the group of pairs assigned to the classifier is generated and stored in the memory 3.

Next, the details of the discrimination process 13 executed by the eye detection device 1 is described. In the discrimination process 13, one of two types of discrimination processes, which will be described later, is selectively executed depending on whether EarlyReject, which discontinues the process under a certain condition, is set to "ON" or "OFF".

ON or OFF of the EarlyReject may be set such that one of ON and OFF is default setting and the setting may be changed to the other in response to an instruction by the user to change the setting, or the setting of ON or OFF may be automatically changed based on a predetermined condition. For example, ON may be default setting, and the setting may be automatically changed to OFF when a saturated pixel is detected in the image of interest.

First, a first discrimination process, which is executed when the EarlyReject is set to ON, is described. This first discrimination process presupposes that a discontinuing threshold Thi is set correspondingly to each of the classifiers Ci (i=1 to N) forming the group of classifiers. The value of the discontinuing threshold Thi (i=1 to N) is larger as the order of the corresponding classifier is lower, where a difference between the discontinuing threshold of each certain classifier and the discontinuing threshold of a classifier immediately before the certain classifier is equivalent to a possible minimum value of the score of the certain classifier if the image to be discriminated is an eye image.

Figure 4:
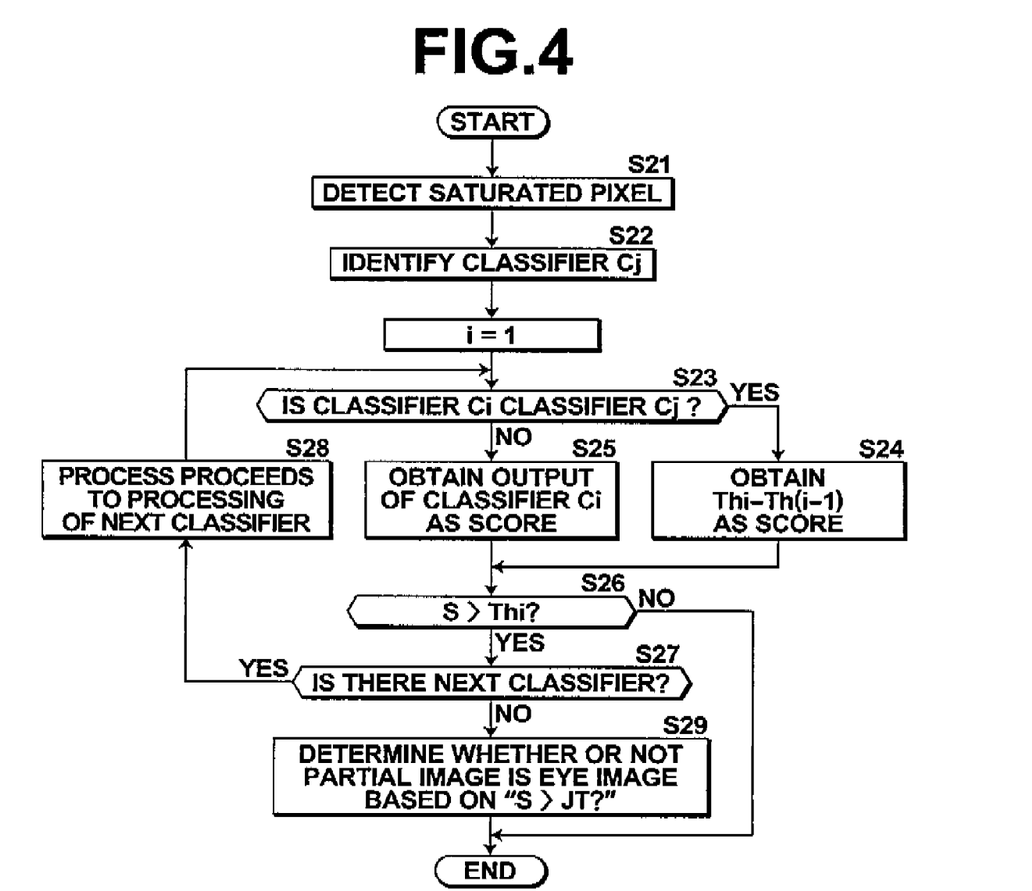
FIG. 4 is a flow chart illustrating the flow of a discrimination process (EarlyReject=ON)

FIG. 4 is a flow chart illustrating the flow of the first discrimination process. In the first discrimination process, first, saturated pixels are detected from the partial image of interest (image to be discriminated), which is cut out during the partial image cutting out process 12. Specifically, the pixel value of each pixel of the partial image is compared with a possible maximum value (saturation value) of the pixel, and if the pixel has the maximum value, the pixel is detected as the saturated pixel (step S21).

Then, from the classifiers Ci (i=1 to N) forming the group of classifiers, classifiers Cj, to which the positions of the saturated pixels detected in step S21 are assigned, are identified. Specifically, with referencing the list stored in the memory 3, all the classifiers to which the positions of the detected saturated pixels are assigned are identified based on the correspondence between each classifier forming the group of classifiers and the positions of the points assigned to the classifier (step S22).

Then, operations in steps S23 to S26 are repeated sequentially from the first classifier C1 until the process is discontinued. Specifically, first, whether or not the classifier Ci is any of the classifiers Cj identified in step S22 is determined (step S23). If the classifier Ci is one of the classifiers Cj identified in step S22, i.e., any of the positions of the saturated pixels is assigned to the classifier (step S23: YES), then, a difference between the discontinuing threshold Thi set in advance correspondingly to the classifier Ci and the discontinuing threshold Th (i−1) set in advance correspondingly to the classifier C(i−1) immediately before the classifier Ci is obtained as the score. It should be noted that, when the classifier Ci is the first classifier C1, there is no classifier before the classifier C1, and therefore the discontinuing threshold set in advance correspondingly to the first classifier C1 is obtained as the score (step S24).

In contrast, if the classifier Ci is none of the classifiers Cj identified in step S22 (step S23: NO), an output obtained by applying the classifier Ci to each partial image is obtained as the score. That is, the combination of differential values between pixel values of the two points of the individual pairs forming the certain group of pairs assigned to the classifier Ci is calculated as a feature quantity, and a value representing a probability of the partial image being an eye image, which is obtained by the classifier Ci based on the feature quantity, is obtained as the score of the classifier Ci (step S25).

Then, a determination as to whether or not a sum S of the score(s) obtained so far exceeds the discontinuing threshold Thi corresponding to the classifier Ci is made (step S26). That is, whether or not the condition S>Thi is satisfied is determined. If this condition is not satisfied, then, it is determined that the partial image, which is the image to be discriminated, is not an eye image, and the discrimination process is discontinued to end the process. In contrast, if it is determined in step S26 that the condition is satisfied, a determination as to whether or not there is a next classifier is made (step S27). If there is a next classifier, the process proceeds to processing of the next classifier Ci (i=i+1) (step S28).

In contrast, if it is determined in step S27 that there is no next classifier, i.e., the classifier Ci is the last classifier, then, a determination as to whether or not the sum S of the scores calculated in step S26 exceeds a predetermined discrimination threshold JT1 is made. If the sum S exceeds the discrimination threshold JT1, it is determined that the partial image is an eye image. If the sum S does not exceed the discrimination threshold JT1, it is determined that the partial image is not an eye image. Then, the discrimination process ends (step S29). The discrimination threshold JT1 is a possible minimum value of the sum of the scores of all the classifiers C1 to CN if the partial image is an eye image.

Next, a second discrimination process, which is executed when the EarlyReject is set to OFF, is described. The second discrimination process is continued until the last classifier without being discontinued in the middle of the process.

Figure 5:
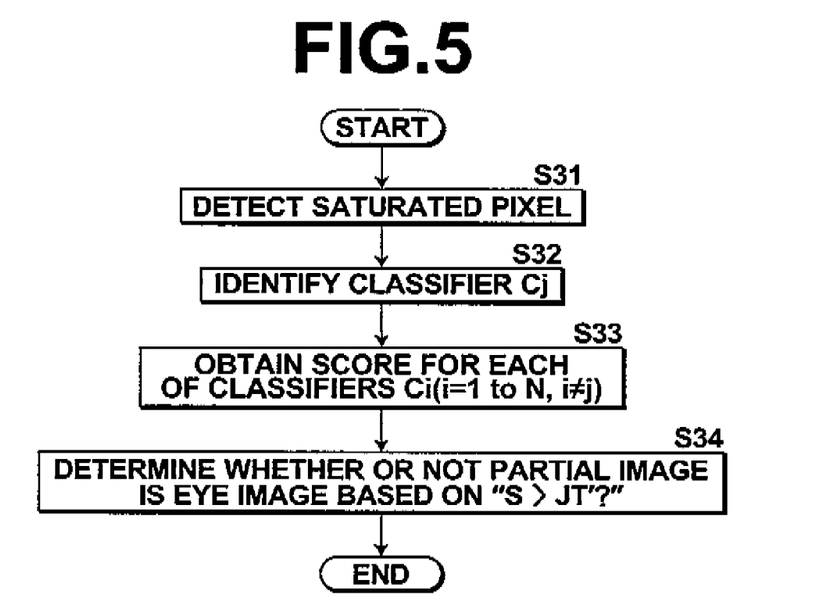
FIG. 5 is a flow chart illustrating the flow of the discrimination process (EarlyReject=OFF).

FIG. 5 is a flow chart illustrating the flow of the second discrimination process. In the second discrimination process, first, saturated pixels are detected from the partial image of interest (image to be discriminated), which is cut out during the partial image cutting out process 12 (step S31), and the classifiers to which positions of the detected saturated pixels are assigned are identified (step S32). These operations in steps S31 and S32 are the same as the operations in steps S21 and S22.

Then, each of the classifiers Ci (i=1 to N, i≠j), which include the classifiers Ci (i=1 to N) forming the group of classifiers except the classifiers Cj identified in step S32, is applied to the partial image, and a resulting output is obtained as the score of the applied classifier. That is, for the classifiers Cj identified in step S32, no score is obtained. For the classifiers Ci (i=1 to N, i≠j) other than the classifiers Cj, the combination of differential values between pixel values of the two points of the individual pairs forming a certain group of pairs assigned to each classifier Ci is calculated as a feature quantity, and a value representing a probability of the partial image being an eye image based on the feature quantity is obtained as the score (step S33).

Then, a determination as to whether or not a sum S2 of the scores obtained in step S33 exceeds a predetermined discrimination threshold JT' is made. If the sum S2 exceeds the discrimination threshold JT', it is determined that the partial image is an eye image. If the sum S2 does not exceed the discrimination threshold JT', it is determined that the partial image is not an eye image. Then, the discrimination process ends (step S34). The discrimination threshold JT' is a value obtained by subtracting "a sum of possible minimum values of the scores of the classifiers Cj identified in step S32 if the partial image is an eye image" from the discrimination threshold JT1 used in the first discrimination process.

Further, in the above-described first discrimination process, if it is determined that the partial image, which is the image to be discriminated, is an eye image, the reliability calculation process 14 for calculating a reliability of the discrimination is executed in the eye detection device 1. In the reliability calculation process 14, the reliability of the result of discrimination is calculated from a ratio of "a sum x of the scores obtained for the classifiers Cj identified in step S22" to "the sum S of the scores obtained for all the classifiers C1 to CN in the first discrimination process". As the ratio of the value x to the value S is larger, the value of reliability is smaller, i.e., the reliability of the result of discrimination is lower. Further, a determination as to whether or not the value "x/S" exceeds a predetermined threshold may be made, and if the value "x/S" does not exceed the threshold, it may be determined that the partial image, which is the image to be discriminated, is not an eye image.

It should be noted that, in the reliability calculation process 14, each of the classifiers forming the group of classifiers, which are connected in series in the order of effectiveness, may be provided with a value representing a contribution of the classifier, which is smaller as the effectiveness of the classifier is lower, and the reliability of the result of discrimination may be calculated from a ratio of "a sum of the contributions of the classifiers Cj, which are identified as having the saturated pixels assigned thereto" to "a sum of the contributions of all the classifiers C1 to CN".

According to this embodiment having the above-described configuration, even when the input image includes saturated pixels due to reflected light, the result of discrimination is not influenced by outputs from the classifiers assigned to those pixels, thereby achieving accurate eye detection with appropriately minimizing the influence of the reflected light. Further, it is not necessary to perform the image correction process, as described in Patent Document 1, as pre-processing, and this allows a simpler device configuration and image processing.

It should be noted that, although a pixel that is determined to have a possible maximum pixel value (saturation value) of the pixel is detected as the saturated pixel in the above-described embodiment, the saturated pixel may be detected by detecting a pixel having a pixel value exceeding a predetermined threshold. For example, in the case where the pixel values of pixels in the input image are represented by values ranging from 0 to 255 (8 bits), a pixel having a pixel value of 255 (maximum value) may be detected as the saturated pixel, or a pixel having a pixel value exceeding a predetermined threshold (250, for example) may be detected as the saturated pixel.

Although the determination as to whether or not each pixel in the input image is the saturated pixel is made based only on the pixel value of the pixel in the above-described embodiment, the determination may be made based on whether or not the pixel belongs to an area which contains at least a predetermined number of continuous pixels that satisfy the same condition, in addition to whether or not the pixel value of the pixel satisfies the above-described condition (i.e., whether or not the pixel value is a maximum value or exceeds a predetermined threshold). For example, all the pixels that satisfy the above-described condition in the input image may be labeled (i.e., the continuous pixels may be provided with the same label), and among such labeled areas, a labeled area that has an area (the number of pixels) equal to or higher than a predetermined threshold may be identified to determine that all the pixels forming the identified area are saturated pixels. In this manner, discrimination between catchlight on an eye ball and catchlight on an eyeglass lens can be achieved to exclude the latter from evaluation.

Still further, although the determination as to whether or not each pixel in the input image is the saturated pixel is made using the pixel value of the pre-processed image in the above-described embodiment, the determination may be made using the pixel value of the original image before subjected to the pre-processing. For example, positions of the saturated pixels may be detected and stored using pixel data of the input image before subjected to the pre-processing, and then, the pre-processing and the partial image cutting out process may be executed. Then, the subsequent discrimination process may be carried out based on the stored positions of the saturated pixels.

Yet further, when the scores of the classifiers forming the group of classifiers are sequentially obtained in the first discrimination process in the above-described embodiment, the score of each certain classifier to which the position of the saturated pixel is assigned is obtained by obtaining a value which is determined based on a difference between the discontinuing threshold set in advance correspondingly to the certain classifier and the discontinuing threshold set in advance correspondingly to a classifier for which the score is obtained immediately before the certain classifier. However, the score of the certain classifier to which the position of the saturated pixel is assigned may be a value obtained by multiplying the difference between the discontinuing thresholds by R (R is a real number of 1 or more), or the maximum value of the scores obtained for the classifier in the past by the discrimination process.

What is claimed is:

1. An object detection device for detecting a specific object from an input image, the device comprising:
    a plurality of classifiers obtained through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;
    a partial image cutting out device which is a circuitry, or a software recorded on a non-transitory computer readable medium used in a processor, configured to cut out partial images of the predetermined size at different positions on the input image; and a discriminating device which is a circuitry, or a software recorded on a non-transitory computer readable medium used in a processor, configured to sequentially obtain scores of the classifiers in a predetermined order, the discriminating device detecting, for each partial image, a position of a saturated pixel in the partial image, identifying, from the classifiers, a classifier to which the detected position is assigned, obtaining the score of each identified classifier by obtaining a value determined based on a difference between a discontinuing threshold set in advance correspondingly to the identified classifier and a discontinuing threshold set in advance correspondingly to one of the classifiers for which the score is obtained immediately before the identified classifier, and obtaining the score of each of the other classifiers by obtaining an output obtained by applying the classifier to the partial image, each time the score of each classifier has been obtained, determining whether or not a sum of the scores obtained so far exceeds the discontinuing threshold set in advance correspondingly to the classifier, if the sum of the scores obtained so far does not exceed the discontinuing threshold, determining that the partial image is not an image showing the object and discontinuing an operation to obtain the score, if the sum of the scores obtained so far exceeds the discontinuing threshold, obtaining the score of the next classifier, when the scores for all the classifiers have been obtained, determining whether or not a sum of the scores obtained for all the classifiers exceeds a discrimination threshold set in advance, if the sum of the scores obtained for all the classifiers exceeds the discrimination threshold, determining that the partial image is an image showing the object, and if the sum of the scores obtained for all the classifiers does not exceed the discrimination threshold, determining that the partial image is not an image showing the object.

2. The object detection device as claimed in claim 1, further comprising a reliability calculating device which is a circuitry, or a software recorded on non-transitory computer readable medium used in a processor, configured to calculate, if the sum of the scores obtained for all the classifiers exceeds the discrimination threshold, a reliability of the discrimination based on a ratio of a sum of the scores obtained for the identified classifiers to the sum of the scores obtained for all the classifiers.

3. The object detection device as claimed in claim 1, wherein the discontinuing threshold is provided correspondingly to each of the classifiers and has a value that is larger as the order of the corresponding classifier is lower, and a value which is determined based on a difference between the discontinuing threshold set correspondingly to each certain classifier and the discontinuing threshold set correspondingly to a classifier for which the score is obtained immediately before the certain classifier is set to be equivalent to a value for which it is assumed that the score of the certain classifier is at least not less than the value if the image to be discriminated is an image showing the object.

4. The object detection device as claimed in claim 2, wherein the reliability calculated by the reliability calculating device is lower as the ratio is larger.

5. An object detection device for detecting a specific object from an input image, the device comprising:

a plurality of classifiers obtained through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

a partial image cutting out device which is a circuitry, or a software recorded on a non-transitory computer readable medium used in a processor, configured to cut out partial images of the predetermined size at different positions on the input image; and a discriminating device which is a circuitry, or a software recorded on a non-transitory computer readable medium used in a processor, configured to detect, for each partial image, a position of a saturated pixel in the partial image, identify, from the classifiers, a classifier to which the detected position is assigned, obtain an output obtained by applying each of the classifiers other than the identified classifiers to the partial image as a score of the applied classifier, determine whether or not a sum of the obtained scores exceeds a discrimination threshold, the discrimination threshold being obtained by subtracting a sum of values for which it is assumed that the scores of all the identified classifiers are at least not less than the values, respectively, if the partial image is an image showing the object from a value for which it is assumed that a sum of the scores of all the classifiers is at least not less than the value if the partial image is an image showing the object, if the sum of the obtained scores exceeds the discrimination threshold, determine that the partial image is an image showing the object, and if the sum of the obtained scores does not exceed the discrimination threshold, determine that the partial image is not an image showing the object.

6. The object detection device as claimed in claim 1, wherein the specific object is an eye.

7. An object detection method for detecting a specific object from an input image, the method comprising the steps of:

generating and preparing a plurality of classifiers through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

cutting out partial images of the predetermined size at different positions on the input image; and sequentially obtaining scores of the classifiers in a predetermined order, comprising detecting, for each partial image, a position of a saturated pixel in the partial image, identifying, from the classifiers, a classifier to which the detected position is assigned, obtaining the score of each identified classifier by obtaining a value determined based on a difference between a discontinuing threshold set in advance correspondingly to the identified classifier and a discontinuing threshold set in advance correspondingly to one of the classifiers for which the score is obtained immediately before the identified classifier, and obtaining the score of each of the other classifiers by obtaining an output obtained by applying the classifier to the partial image, each time the score of each classifier has been obtained, determining whether or not a sum of the scores obtained so far exceeds the discontinuing threshold set in advance correspondingly to the classifier, if the sum of the scores obtained so far does not exceed the discontinuing threshold, determining that the partial image is not an image showing the object and discontinuing an operation to obtain the score, if the sum of the scores obtained so far exceeds the discontinuing threshold, obtaining the score of the next classifier, when the scores for all the classifiers have been obtained, determining whether or not a sum of the scores obtained for all the classifiers exceeds a discrimination threshold set in advance, if the sum of the scores obtained for all the classifiers exceeds the discrimination threshold, determining that the partial image is an image showing the object, and if the sum of the scores obtained for all the classifiers does not exceed the discrimination threshold, determining that the partial image is not an image showing the object.

8. The method as claimed in claim 7, further comprising the step of calculating, if the sum of the scores obtained for all the classifiers exceeds the discrimination threshold, a reliability of the discrimination based on a ratio of a sum of the scores obtained for the identified classifiers to the sum of the scores obtained for all the classifiers.

9. An object detection method for detecting a specific object from an input image, the method comprising:

generating and preparing a plurality of classifiers through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

cutting out partial images of the predetermined size at different positions on the input image;

detecting, for each partial image, a position of a saturated pixel in the partial image;

identifying, from the classifiers, a classifier to which the detected position is assigned;

obtaining an output obtained by applying each of the classifiers other than the identified classifiers to the partial image as a score of the applied classifier;

determining whether or not a sum of the obtained scores exceeds a discrimination threshold, the discrimination threshold being obtained by subtracting a sum of values for which it is assumed that the scores of all the identified classifiers are at least not less than the values, respectively, if the partial image is an image showing the object from a value for which it is assumed that a sum of the scores of all the classifiers is at least not less than the value if the partial image is an image showing the object;

if the sum of the obtained scores exceeds the discrimination threshold, determining that the partial image is an image showing the object, and if the sum of the obtained scores does not exceed the discrimination threshold, determining that the partial image is not an image showing the object.

10. A non-transitory computer readable medium containing an object detection program for causing a computer to function as an object detection device for detecting a specific object from an input image, the computer being caused to function as:

a plurality of classifiers obtained through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

a partial image cutting out device which is a circuitry, or a software recorded on a non-transitory computer readable medium used in a processor, configured to cut out partial images of the predetermined size at different positions on the input image; and a discriminating device which is a circuitry, or a software recorded on a non-transitory computer readable medium used in a processor, configured to sequentially obtain scores of the classifiers in a predetermined order, the discriminating detecting, for each partial image, a position of a saturated pixel in the partial image, identifying, from the classifiers, a classifier to which the detected position is assigned, obtaining the score of each identified classifier by obtaining a value determined based on a difference between a discontinuing threshold set in advance correspondingly to the identified classifier and a discontinuing threshold set in advance correspondingly to one of the classifiers for which the score is obtained immediately before the identified classifier, and obtaining the score of each of the other classifiers by obtaining an output obtained by applying the classifier to the partial image, each time the score of each classifier has been obtained, determining whether or not a sum of the scores obtained so far exceeds the discontinuing threshold set in advance correspondingly to the classifier, if the sum of the scores obtained so far does not exceed the discontinuing threshold, determining that the partial image is not an image showing the object and discontinuing an operation to obtain the score, if the sum of the scores obtained so far exceeds the discontinuing threshold, obtaining the score of the next classifier, when the scores for all the classifiers have been obtained, determining whether or not a sum of the scores obtained for all the classifiers exceeds a discrimination threshold set in advance, if the sum of the scores obtained for all the classifiers exceeds the discrimination threshold, determining that the partial image is an image showing the object, and if the sum of the scores obtained for all the classifiers does not exceed the discrimination threshold, determining that the partial image is not an image showing the object.

11. A non-transitory computer readable medium containing an object detection program for causing a computer to function as an object detection device for detecting a specific object from an input image, the computer being caused to function as:

a plurality of classifiers obtained through a learning process using a number of sample images of a predetermined size showing the object, each classifier having assigned thereto a different position on an image to be discriminated and outputting, based on pixel values of pixels at the assigned position, a value representing a probability of the image to be discriminated being an image showing the object;

a partial image cutting out device which is a circuitry, or a software recorded on a non-transitory computer readable medium used in a processor, configured to cut out partial images of the predetermined size at different positions on the input image; and a discriminating device which is a circuitry, or a software recorded on a non-transitory computer readable medium used in a processor, configured to detect, for each partial image, a position of a saturated pixel in the partial image, identify, from the classifiers, a classifier to which the detected position is assigned, obtain an output obtained by applying each of the classifiers other than the identified classifiers to the partial image as a score of the applied classifier, determine whether or not a sum of the obtained scores exceeds a discrimination threshold, the discrimination threshold being obtained by subtracting a sum of values for which it is assumed that the scores of all the identified classifiers are at least not less than the values, respectively, if the partial image is an image showing the object from a value for which it is assumed that a sum of the scores of all the classifiers is at least not less than the value if the partial image is an image showing the object, if the sum of the obtained scores exceeds the discrimination threshold, determine that the partial image is an image showing the object, and if the sum of the obtained scores does not exceed the discrimination threshold, determine that the partial image is not an image showing the object.

12. The object detection device as claimed in claim 2, wherein the discontinuing threshold is provided correspondingly to each of the classifiers and has a value that is larger as the order of the corresponding classifier is lower, and a value which is determined based on a difference between the discontinuing threshold set correspondingly to each certain classifier and the discontinuing threshold set correspondingly to a classifier for which the score is obtained immediately before the certain classifier is set to be equivalent to a value for which it is assumed that the score of the certain classifier is at least not less than the value if the image to be discriminated is an image showing the object.

13. The object detection device as claimed in claim 2, wherein the specific object is an eye.

14. The object detection device as claimed in claim 3, wherein the specific object is an eye.

15. The object detection device as claimed in claim 4, wherein the specific object is an eye.

* * * * *